United States Patent
Yang et al.

(10) Patent No.: US 7,365,145 B2
(45) Date of Patent: Apr. 29, 2008

(54) MOISTURE CURABLE SILYLATED POLYMER CONTAINING FREE POLYOLS FOR COATING, ADHESIVE AND SEALANT APPLICATION

(75) Inventors: Yurun Yang, Shanghai (CN); Shen Min, Shanghai (CN); Misty Huang, New City, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 222 days.

(21) Appl. No.: 11/226,760

(22) Filed: Sep. 14, 2005

(65) Prior Publication Data

US 2007/0060714 A1    Mar. 15, 2007

(51) Int. Cl.
*C08G 77/00*    (2006.01)

(52) U.S. Cl. ............... 528/29; 525/474; 528/17; 528/18; 528/21; 528/35

(58) Field of Classification Search ............ None
See application file for complete search history.

(56) References Cited

U.S. PATENT DOCUMENTS

| | | | |
|---|---|---|---|
| 4,481,367 A | 11/1984 | Knopf | |
| 4,857,623 A | 8/1989 | Emmerling et al. | |
| 4,906,707 A * | 3/1990 | Yukimoto et al. | 525/403 |
| 4,985,491 A | 1/1991 | Reisch | |
| 5,281,636 A * | 1/1994 | Nambu et al. | 524/378 |
| 5,344,890 A * | 9/1994 | Miyazono et al. | 525/326.5 |
| 5,554,709 A | 9/1996 | Emmerling et al. | |
| 5,602,204 A * | 2/1997 | Harimoto et al. | 525/209 |
| 5,910,555 A | 6/1999 | Ueda et al. | |
| 6,180,175 B1 * | 1/2001 | Saika et al. | 427/387 |
| 6,197,912 B1 | 3/2001 | Huang et al. | |

FOREIGN PATENT DOCUMENTS

| | | |
|---|---|---|
| EP | 0 293 733 A2 | 12/1988 |
| EP | 0 419 669 B1 | 4/1991 |
| EP | 419 669 A1 * | 4/1991 |
| JP | 1-141952 * | 6/1989 |

* cited by examiner

*Primary Examiner*—Marc S. Zimmer
(74) *Attorney, Agent, or Firm*—Dominick G. Vicari

(57) ABSTRACT

The present invention relates to moisture-curable silylated polymers having unreacted or "free" hydroxyl groups prior to cure with improved physical properties, lower viscosity and lower cost, suitable for preparing coatings, adhesives and sealants.

19 Claims, No Drawings

MOISTURE CURABLE SILYLATED POLYMER CONTAINING FREE POLYOLS FOR COATING, ADHESIVE AND SEALANT APPLICATION

FIELD OF THE INVENTION

The present invention relates to moisture-curable silylated polymer compositions with improved physical properties. More particularly, this invention relates to the preparation of low viscosity moisture-curable silylated polymer resins as sealants, adhesives and coatings.

BACKGROUND OF THE INVENTION

Polyurethanes containing reactive silane groups, also referred to as silane-terminated polyurethanes (STPs), and their use as sealants and adhesives are known and described, for example, U.S. Pat. No. 5,554,709 describes a moisture-curing alkoxysilane-terminated polyurethanes which can be obtained by reacting polyurethane prepolymers with sulfur-free alkoxysilanes. U.S. Pat. No. 4,857,623 describes alkoxysilane-terminated, moisture-hardening polyurethanes obtained by reaction of hydroxy-terminated diols and/or triols with diisocyanates to form isocyanate-terminated polyurethanes, and U.S. Pat. No. 6,197,912 describes moisture curable polymers having terminal or pendant silyl groups that exhibit improved thermal stability, elongation, and tear resistance.

U.S. Pat. No. 4,985,491 discloses a polyether triol fabricated in the presence of a double metal cyanide catalyst that is reacted with a polyisocyanate to produce an isocyanate-terminated prepolymer. The prepolymer is then chain-extended to produce the desired sealant. U.S. Pat. No. 4,481,367 discloses prepolymers, which result from reacting a short chain glycol with substantial excess of diisocyanate to form linear urethane prepolymer terminated with isocyanate groups.

A curable resin composition containing an oxyalkylene polymer having a functional group such as a hydroxyl, epoxy or isocyanate which is directly reacted with a compound having a silicon-containing reactive group is disclosed in U.S. Pat. No. 5,910,555.

However, a disadvantage of these moisture-curable polymers is the presence of urethane groups, which causes the products to have a high viscosity. To achieve suitable application viscosities, the high viscosity is reduced by the addition of higher amounts of plasticizer and lesser amounts of fillers, resulting in more expensive sealant products.

Accordingly, it is an object of the present invention to provide moisture-curable silylated polymer that can be prepared with lower viscosities and improved physical properties at reduced costs. The products of the present invention are suitable for use as sealants, adhesives and coatings.

All of the United States Patents disclosed herein are incorporated by reference.

SUMMARY OF THE INVENTION

One aspect of the present invention is a moisture-curable composition comprising the substantially moisture free mixture of: a) a silylated polymer; b) at least one polyol; and c) catalyst for the silylated polymer and polyol reaction. Wherein, the silylated polymer of the moisture-curable composition is at least one member selected from the group consisting of: (i) silylated polymer obtained from the reaction of polyol with isocyanatosilane, (ii) silylated polymer obtained from the reaction of hydroxyl terminated polyurethane prepolymer with isocyanatosilane; (iii) silylated polymer obtained from the reaction of isocyanto-terminated polyurethane prepolymer with hydrogen active organofunctional silane; and (iv) silylated polymer obtained from silane terminated polyether.

Still other aspects of the present invention are curable formulations useful for instance as sealants, containing the aforementioned composition of matter together with a cure catalyst and one or more conventional finctional adjuvants selected from the group consisting of fillers, plasticizers, thixotropes, ultraviolet stabilizers, and adhesion promoters.

Yet another aspect of the present invention is the process of making a composition of matter which upon curing exhibits improved viscosity, elongation, tensile strength and hardness, comprising mixing the aforementioned silylated polymer (a) with at least one polyol (b) and a catalyst (c).

DEFINITIONS

As used herein, the term "polyisocyanate" means an organic compound having two or more than two isocyanate groups and "polyol" means a compound having two or more hydroxy groups thereon.

Unless otherwise indicated herein, "alkyl" may be linear, branched or cyclic; "aryl" includes alkaryl groups such as tolyl, and aralkyl groups such as benzyl; and "alkylene" may be linear, branched or cyclic and includes alkylene groups having pendent or internal aryl groups such as 1,4-diethylenephenylene

DETAILED DESCRIPTION OF THE INVENTION

The present invention relates to moisture-curable compositions. The compositions are substantially moisture free mixtures of silylated polymers and polyols having an effective amount of unreacted or "free" hydroxyl groups prior to cure. Upon application and in the presence of moisture and catalyst the silylated polymers react with the polyols to provide efficient and economical low viscosity coatings, sealants and adhesives.

Silylated polymers of the present invention are initially prepared with isocyanate-terminated polyurethane prepolymers or prepared with hydroxyl terminated polyurethane prepolymer that are obtained using hydroxy terminated polyols. They generally have a molecular weight between 500 and 25,000, more narrowly between about 1,000 to 20,000.

The silylated polymers of the present invention may be prepared with polyether polyols, polyester polyols, polyetherester polyols, polyesterether polyols, polyolefin polyols, polycaprolactone and even polyacylate polyols, hydroxyl-terminated hydrocarbon polymers, e.g. those obtained from butadiene, or other polyol compounds. Other polyols contemplated herein include polyols like polyhydroxy polycarbonates, polyhydroxy polyacetals, polyhydroxy polyacrylates, polyhydroxy polyester amides and polyhydroxy polythioethers, polyolefin polyols and low molecular polyol like glycol, triethylene glycol, propylene glycol, butanediol, hexylene glycol, trimethylol propane, 1,2,6-hexanetriol, 1,2,4-butanetriol, trimethylol ethane, pentaerythritol, mannitol, sorbitol, sucrose or/and alkylol amines such as diethanolamine, triethanolamine, and the like.

Suitable polyols include polyoxyalkylene (especially polyoxyethylene, polyoxypropylene, and polyoxybutylene)

diols, polyoxyalkylene triols, polytetramethylene glycols, polyacetals, polyhydroxy polyacrylates, polyhydroxy polyester amides and polyhydroxy polythioethers, polycaprolactone diols and triols, and the like. Other polyol compounds, including tetraols, hexaols, alkoxylated bisphenols or polyphenols, and various sugars and derivatives thereof may also be used, including pentaerythritol, sorbitol, mannitol and the like. In one embodiment of the present invention, the polyols used in the production of isocyanate-terminated polyurethane prepolymers are polypropylene glycols with equivalent weights between about 500 and 25,000. Mixtures of polyols of various structures, molecular weights and/or functionalities may also be used.

The above-mentioned hydroxyfunctional polyols are converted into isocyanate-terminated polyurethane prepolymers or hydroxyl-terminated polyurethane prepolymer in known manner by reaction with isocyanates. In one embodiment of the present invention, isocyanate terminated polyurethane prepolymers are prepared by reacting an excess of polyisocyanate with a polyol or a combination of polyols usually in the presence of a catalyst. In another embodiment of the present invention, hydroxy terminated polyurethane prepolymers are prepared by reacting an excess of polyol or a combination of polyols with a polyisocyanate usually in the presence of a catalyst.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, 4,4'diphenyl-methanediisocyanate, isophorone diisocyanate, dicyclohexylmethane-4,4'-diisocyanate, various liquid diphenylmethanediisocyanates containing a mixture of 2,4- and 4,4'isomers, and the like, and mixtures thereof. In one embodiment of the present invention, the isocyanate functional monomer employed is a mixture of 2,4- and 4,4'diphenylmethane diisocyanates (MDI) which is available from Bayer under the trade name Desmodur® M-0129.

A catalyst may be used in the preparation of the above-mentioned polyurethane prepolymers. Suitable catalysts are dialkyltin dicarboxylates, such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production polyurethane prepolymer. Other catalysts include zirconium complex (KAT XC6212, K-KAT XC-A209 available from King Industries, Inc., aluminum chelate (K-KAT 5218, K-KAT 4205 available from King Industries, Inc., titanic chelate (TYZER® types available from DuPont company, and KR types available from Kenrich Petrochemical, Inc., and other organic metal, such as Zn, Co, Ni, and Fe and the like.

In a second process step, the isocyanate-terminated polyurethane prepolymers are reacted with silane(s) to prepare silylated polyurethane prepolymer. The silane-terminated polyurethanes may be prepared by various methods know in the art. In one method the silane-terminated polyurethanes are prepared by reacting diisocyanates with polyols to form isocyanate-terminated prepolymers, which are then reacted with aminosilanes or any other hydrogen active silane that can react with isocynate to form the silane-terminated polyurethanes. The silylated polymers may also be prepared by reacting unsaturated monools with diisocyanates to form intermediates containing unsaturated end groups and then converting these unsaturated groups to alkoxysilane groups by hydrosilylation. In another method the silylated polymer are prepared in one step by the reaction of polyether diols with isocyanatosilanes. Silylated polymer may also be obtained from the reaction of hydroxyl terminated polyurethane prepolymer with isocyanatosilane.

Suitable silanes that may be used to prepare silane-terminated polyurethanes include, but are not limited to N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysila, N-ethyl-4-amino-3,3dimethylbutyldimethoxymethylsilane, N-ethyl-4-amino-3,3-dimethylbutyltrimethoxysilane, bis-(3-trimethoxysilyl-2-methylpropyl)amine and N-(3'-trimethoxysilylpropyl)-3-amino-2-methylpropyltrimethoxysilane.

Moreover, any hydrogen active organofuictional silane that includes at least one functional group (e.g., hydrogen) that is reactive with an isocyanate group of the polyurethane prepolymer, and at least one silyl group can be used. Examples of useful silyl groups include alkoxysilyls, aryloxysilyls, alkyloxyiminosilyls, oxime silyls, and amino silyls. In one embodiment of the present invention, the hydrogen active organofunctional silanes include, e.g., aminosilanes (e.g., secondary amino-alkoxysilanes and mercapto-alkoxysilanes. Examples of suitable aminosilanes include phenyl amino propyl trimethoxy silane, methyl amino propyl trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted 4-amino 3,3-dimethyl butyl trimethoxy silane, amino propyl triethoxy silane and mixtures thereof. Specific examples of which include N-methyl-3-amino-2-methylpropyltrimethoxysilane, N-ethyl-3-amino-2-methylpropyltrimethoxysilane, N-ethyl-3-amino-2-methylpropyidiethoxysilane, N-ethyl-3-amino-2-methylpropyltriethoxysilane, N-ethyl-3-amino-2-methylpropylmethyidimethoxysilane, N-butyl-3-amino-2-methylpropyltrimethoxysilane, 3-(N-methyl-3-amino-1-methyl-1-ethoxy) propyltrimethoxysilane, N-ethyl-4-amino-3,3-dimethylbutyidimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N,N-bis[(3-triethoxysilyl)propyl]amine, N,N-bis[(3-tripropoxy-silyl)propyl]amine, N-(3-trimethoxysilyl) propyl-3-[N-(3-trimethoxysilyl)-propylamino]propionamide, N-(3-triethoxysilyl) propyl-3-[N-3-triethoxysilyl]-propylamino] propionamide, N-(3-trimethoxysilyl) propyl-3-[N-3-triethoxysilyl]-propylamino]propionamide, 3-trimethoxysilylpropyl 3-[N-(3-trimethoxysilyl)-propylamino]-2-methyl propionate, 3-triethoxysilylpropyl 3-[N-(3-triethoxysilyl)-propylamino]-2-methyl propionate, 3-trimethoxysilylpropyl 3-[N-(3-triethoxysilyl)-propylamino]-2-methyl propionate, gamma-mercaptopropyltrimethoxysilane and N,N'-bis((3-trimethoxysilyl)propyl)amine.

Useful commercially available aminosilanes include, e.g., aminosilanes available under the SILQUEST series of trade designations including, e.g., SILQUEST A-1170, SILQUEST A-1110, SILQUEST Y-9669 and SILQUEST A-15 from General Electric Company, under the DYNASYLAN series of trade. designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.), and under the A-189 gamma-mercaptopropyltrimethoxysilane trade designation from General Electric Company (GE).

Silanes may be prepared by various methods know in the art, such as, hydrosilylation of a corresponding secondary amino branched or cyclic alkene with an alkoxyhydridosilane, trialkoxyhydridosilanes, or aryloxyhydridosilane, and the like. Alternatively one can react such an alkenylarnine with a hydridochlorosilane, and the resulting aminoalkylchlorosilane subsequently esterified to the corresponding alkoxy or aryloxy silane. Further, silanes may be obtained from silyl group-containing polyoxyalkylene polymers that are produced by introducing an unsaturated group such as an allyl or methallyl group into a polyoxyalkylene polymer and utilizing its terminal hydroxyl group. A silane terminated polyether may be produce by reacting the unsaturated group-terminated polyoxyalkylene polymer with a compound having a hydrogen-silicon bond and a crosslinkable silyl group in each molecule in the manner of hydrosilylation.

The reaction of the isocyanate-terminated polyurethane prepolymers with the silane(s) of the present invention is preferably carried out in the presence of catalysts. Suitable catalysts include, but are not limited to tin or titanium compounds, dibutyltin dilaurate, and mixture thereof.

The silane-terminated polyurethane prepolymer (silylated polymer) is then mixed with a suitable polyol and catalyst under moisture free conditions in which there is no reaction between the silylated polymer and polyol. Suitable polyols for addition to the silylated polymers of the present invention include, but are not limited to organic materials having hydroxyl groups of more than 2. Examples of some high molecular weight polyols of the present invention include, but are not limited to polyester polyols (both aliphatic and aromatic based), polyether polyols, polyhydroxy polycarbonates, polyhydroxy polyacetals, polyhydroxy polyacrylates, polyhydroxy polyester amides and polyhydroxy polythioethers, polyolefin polyols, and the like, and mixtures thereof. In one embodiment of the present invention, the polyol is high molecular weight polyol selected from the group consisting of aliphatic and aromatic polyester polyols, polyether polyols, polyhydroxy polycarbonates, polyhydroxy polyacetals, polyhydroxy polyacrylates, polyhydroxy polyester amides and polyhydroxy polythioethers, polyolefin polyols, and the like, and mixtures thereof.

Low molecular weight polyols are suitable for addition to the silylated polymers of the present invention. In one embodiment, the low molecular weight polyols of the present invention, include but are not limited to, alcohols such as glycol, triethylene glycol, propylene glycol, butanediol, hexylene glycol, trimethylol propane, 1,2,6-hexanetriol, 1,2,4-butanetriol, dietheylene glycol, dipropylene glycol, mannide, trimethylol ethane, pentaerythritol, mannitol, sorbitol, sucrose or/and alkylol amines such as diethanolamine, triethanolamine, and the like, and mixtures thereof. In another embodiment of the present invention, the low molecular weight polyols are glycols, glycerine, trimethylol propane, pentaerythritol, glycosides, sugars, alkylol amine, and the like, and mixture thereof. In yet another embodiment of the present invention, the low molecular weight polyols are glycol, triethylene glycol, butanediol, dietheylene glycol, dipropylene glycol diethanolamine, triethanolamine, and the like, and mixture thereof.

In another embodiment of the present invention, a mixture of high molecular weight poiyol and low molecular weight polyol is suitable for addition to the silylated polymers of the present invention.

In one embodiment of the present invention, the silylated polymers are mixed with high molecular weight polyols that have equivalent weight of at least 200. In another embodiment of the present invention, the silylated polymers are mixed with polyols that have an equivalent weight of about 400 to about 20,000. In another aspect of the present invention, the silylated polymers are mixed with polyols that have equivalent weight of about 500 to about 18,000.

In another embodiment of the present invention, the polyol is present at a level providing from 1 to 100 hydoxyl mole percent, per mole of alkoxy in the silylated polymer. In yet another embodiment of the present invention, the polyol is present at a level providing from 5 to 80 hydoxyl mole percent, per mole of alkoxy in the silylated polymer. In still another embodiment of the present invention, the polyol is present at a level providing from 5 to 50 hydoxyl mole percent, per mole of alkoxy in the silylated polymer.

Suitable catalysts for the silane-terminated polyurethane prepolymer and polyol reaction, which occurs upon exposure to moisture, include but are not limited to organometallic catalysts, amine catalysts, and the like. In one embodiment of the present invention, the catalyst for the silane-terminated polyurethane prepolymer and polyol reaction is selected from the group consisting of organic dibutyltin, zirconium complex, aluminum chelate, titanic chelate, organic zinc, organic cobalt, organic iron, organic nickel and organobismuth, and mixtures thereof. In another embodiment of the present invention, the catalyst for the silane-terminated polyurethane prepolymer and polyol reaction is an amine catalyst is selected from the group consisting of primary amine, secondary amine, tertiary amine and aminosilane and mixtures thereof. In yet another embodiment of the present invention, the catalyst for the silane-terminated polyurethane prepolymer and polyol reaction is a mixer of organometallic catalyst and amine catalyst.

The mixture of silylated polymer, polyol and catalyst remain stable until the mixture is exposed to moisture, i.e. during application. Upon exposure to moisture, the alkoxy group, such as, Si—$OCH_3$, in the silylated polymer will hydrolyze to Si—OH groups, which will react with either with themselves (Si—OH) or react with polyol (C—OH) and yield Si—O—Si or Si—O—C, i.e. a condensation reaction. The catalyst, for example organic metal like tin catalysts or amine catalyst are widely use in the formulation to catalyze both hydrolyze and condensation reactions.

As such, improved physical properties, lower viscosity and lower cost can be achieved by using different type and amount of polyols in the moisture-curable silylated polymer resins. The object is suitable for preparing coating, adhesive and sealant.

The present invention also relates to the use of the moisture-curing silylated polymer containing "free" polyols as coating, sealing or adhesive compositions. For practical application, the moisture-curing silylated polymer may contain typical additives, such as pigments, fillers, curing catalysts, dyes, plasticizers, thickeners, coupling agents, extenders and UV stabilizers. Suitable fillers are isocyanate-inert inorganic compounds such as, for example, chalk, lime flour, precipitated and/or pyrogenic silica, aluminum silicates, ground minerals and other inorganic fillers familiar to one skilled in the art. In addition, organic fillers, particularly short-staple fibers and the like, may also be used. Fillers which provide the preparations with thixotropic properties, for example swellable polymers, are preferred for certain applications. The typical additives mentioned may be used in the quantities familiar to the expert.

The invention is illustrated by the following non-limiting examples.

EXAMPLES

Prepolymer was synthesized according to the formulation in the following Table 1.

TABLE 1

Formulation of silylated prepolymers

| Materials | Parts |
|---|---|
| Acclaim 4200 | 100 |
| M-0129 | 8.74 |
| Formez SUL-4 | 5.6 ppm |
| Silquest A-Link15 | 4.5 |
| Capping point | 0.67% |
| Alkoxy equivalent (g/mole) | 1850 |

Raw Materials of Table 1:

Acclaim® 4200 (polyoxypropylene diol, Mn=4,000, and a functionality of 2, available from Bayer Corporation), MDI (Desmodur® M-0129, MDI with about 55% 2,4-MDI & 45% 4,4-MDI, from Bayer; A-Link® 15 (N-ethyl-3-trimethoxysilyl-2-methyl-propanamine, from General Electric Company (GE)); SUL-4, (Formerz, Dibutyltin dilaurate from General Electric Company)

Synthesis Process for Prepolymer of Table 1:

Charge kettle with the diol(s). Heat the kettle to 600C with stirring and sparge with nitrogen gas in a moderate flow. Continue this drying process overnight or until the moisture concentration is less than 200 ppm by Karl Fisher titration. Cool down the kettle to 30° C. and add catalyst to the reactor using a GC syringe or auto pipet. After the catalyst has been well mixed, add the isocyanates and begin heating. The temperature was maintained at 65° C. and monitors the isocynate content by titration. When isocyanate (NCO) content was reached capping point e.g. 0.67%, add the silane capping agent (A-Link 15) and continue to run the reaction at 65° C. until no free NCO could be detected.

A series of examples, 1 through 6, were made by blending a silylated prepolymer (SPUR) prepared according to formulation of Table 1 with different polyether or polyester polyols and SUL-4 catalyst (Formerz, Dibutyltin dilaurate from General Electric Company) as listed in Table 2.

Mechanical Properties test specimens of the silylated prepolymers (SPUR) and polyols were prepared by adding 2% catalyst (SUL-4), into the silylated prepolymer and then cure in the 50° C./50% relative humidity chamber for seven (7) days. The physical properties and viscosity of these samples were listed in Table 2.

The viscosity of silylated prepolymer/polyol blends (Table 2) can be reduced more than half without negative impact on physical properties by using 36 weight percent of Acclaim® 8200, 30% GEP 330N polyether polyols and 9% Stepanpol PD-110LV aromatic polyester polyol in the silylated prepolymers. The samples containing GR-835G high functionality polyether polyol and 5120 adipic polyester polyol shows higher hardness and improved physical properties although the viscosity is slightly higher than pure silylated prepolymer. The curing rate of silylated prepolymer/polyol blends is slightly lower than pure silylated prepolymer; however, all samples can be cured within 2 hr by using 2% of SUL-4.

During cure, polyol will react with SPUR prepolymer and form Si—O—C bond. In order to check the stability of SPUR/polyol blends (Si—O—C bond), samples were immersed in room temperature water for 1 month and then physical properties of samples were tested (Table2). The results of the immersion test indicate there is not significant impact on tensile strength and elongation for all samples except the sample blended with 5120 polyester. The poor water resistance of the sample blended with 5120 polyester is due to the poor water resistance of adipic polyester structure of 5120 polyol. The results indicate that the stability of Si—O—C bond is good.

Example A through I, as listed in Table 3, were performed by blending the silylated prepolymer (SPUR) that was prepared for use in Example 1 through 6 with low molecular polyols, for example, 1,4-butanediol and diglycol, as well as other polyether polyols as listed in Table 3.

The result shows that adding 18-36 weight percent polyether polyol to silylated prepolymer preparation of Examples 1-6, can reduce the viscosity with some decrease of tensile strength and hardness. When low molecular weight diol or triol were added to the silylated prepolymer, the physical properties and hardness increased.

TABLE 2

Properties of silylated prepolymer blends with different polyols

| Example | Formulation | Alkoxy:OH (mole) | Viscosity (cps) | tack free time | Hardness (shore A) | Tensile strength (psi) | Elongation (%) | After immerse in water for 1 month | |
|---|---|---|---|---|---|---|---|---|---|
| | | | | | | | | Tensile strength (psi) | Elongation (%) |
| 1 | 100 g SPUR prepolymer/2% SUL-4 | — | 155,000 | 2 hr | 17 | 54 | 78 | 58 | 82 |
| 2 | 100 g SPUR prepolymer/36 g *Acclaim 8200/2% SUL-4 | 6:1 | 54,000 | 2 hr | 21 | 86 | 74 | 91 | 68 |
| 3 | 100 g SPUR prepolymer/30 g **GEP 330N/2% SUL-4 | 3:1 | 54,000 | 2 hr | 14.8 | 64 | 90 | 62 | 82 |
| 4 | 100 g SPUR prepolymer/18 g ***5120/2% SUL-4 | 3:1 | 176,000 | 2 hr | 21.7 | 95 | 127 | 64 | 56 |
| 5 | 100 g SPUR prepolymer/2.3 g ****GR-835G/2% SUL-4 | 3:1 | 177,000 | 2 hr | 25.6 | 97 | 94 | 99 | 85 |
| 6 | 100 g SPUR prepolymer/9 g *****PD-110LV/2% SUL-4 | 3:1 | 65,600 | 2 hr | 23 | 87 | 101 | 100 | 108 |

*Acclaim 8200: low unsaturated polyether polyol with Mn = 8000, fn-2 from Bayer Corporation.
**GEP 330N: EO capped polyether polyol with Mn = 5000, fn = 3 from Shanghai Gaoqiao Petrochem (SGP).
***GR-835G: Sucrose started polyether polyol with OH = 410 mg KOH/g from SGP.
****5120: AA/DEG/EG based polyester polyol with OH = 53-59 mg KOH/g, fn = 2 from Eternal Chem Corporation.
*****Stepanpol PD-110LV: aromatic polyester with OH = 110 mg KOH/g, fn = 2 from the Stepan Co. Ltd.

TABLE 3

Properties of SPUR prepolymer blends with different polyols.

| Samples | Formulation | Alkoxy:OH (mole ratio) | Viscosity (cps) | Hardness (shore A) | Tensile strength (psi) | Elongation (%) |
|---|---|---|---|---|---|---|
| A | 100 g SPUR prepolymer/1% SUL-4 | — | 159,000 | 22 | 105 | 78 |
| B | 100 g SPUR prepolymer/36 g *Acclaim 4200/2% SUL-4 | 3:1 | 51,000 | 14.7 | 70 | 122 |
| C | 100 g SPUR prepolymer/18 g **GE-220/1% SUL-4 | 3:1 | 43,200 | 22.5 | 78 | 73 |
| D | 100 g SPUR prepolymer/36 g GE-220/2% SUL-4 | 1.5:1 | 80,000 | 13 | 70 | 72 |
| E | 100 g SPUR prepolymer/0.82 g ***BDO/1% SUL-4 | 3:1 | 151,000 | 29.1 | 128 | 108 |
| F | 100 g SPUR prepolymer/0.9 g ****TTA/1% SUL-4 | 3:1 | 152,000 | 20.8 | 110 | 124 |
| G | 100 g SPUR prepolymer/1 g DEG/1% SUL-4 | 3:1 | 149,000 | 21.5 | 120 | 107 |
| H | 100 g SPUR prepolymer/1.8 g TTA/1% SUL-4 | 3:1 | 148,000 | 21.5 | 131 | 154 |
| I | 100 g SPUR prepolymer/2 g *****DEG/1% SUL-4 | 1.5:1 | 146,000 | 15.5 | 106 | 85 |

*Acclaim ® 4200: low unsaturated polyoxypropylene diol, Mn = 4,000, and a functionality of 2, available from Bayer Corporation.
**GE-220: polyether polyol with Mn = 2000, fn = 2 from Shanghai Gaoqiao Petrochem (SGP).
***BDO: 1,4-butanediol.
****TTA: triethanolamine.
*****DEG: diglycol.

In order to further check the stability of silylated prepolymer/polyol blends (Si—O—C bond), samples A through I, were immersed into boiling water for 5 hours, after which the weight retain and physical properties were tested and reported in Table 4. The result indicates that after immersion test in boiling water, there is less than 1.5 weight percent loss for all samples. There is visible impact on hardness, tensile strength and elongation for all samples. The hardness retained by the silylated prepolymer/polyether polyol blends is less than pure silylated prepolymer, whereas the silylated prepolymer/low Mw diol (triol) blends is higher than pure silylated prepolymer (SPUR). The tensile strength retain is similar for all samples. Pure SPUR shows less change on elongation than SPUR/polyol blends. The results show that stability depends on the type and amount of polyols used.

TABLE 4

Properties of SPUR/Polyols blends after immersion in boiling water for 5 hours

| | | After 5 hr immersion in boiling water | | | | | | |
|---|---|---|---|---|---|---|---|---|
| Samples | Formulation | Weight retain (%) | Hardness (Shore A) | Tensile strength (psi) | Elongation (%) | hardness retain (%) | Tensile strength retain (%) | Elongation change (%) |
| A | 100 g SPUR prepolymer/1% SUL-4 | 99.85 | 11.5 | 74 | 121 | 52.3 | 70.5 | 155.1 |
| B | 100 g SPUR prepolymer/36 g 4200/2% SUL-4 | 99.57 | 6.2 | 47 | 190 | 42.2 | 67.1 | 155.7 |
| C | 100 g SPUR prepolymer/GE-18 g 220/1% SUL-4 | 99.52 | 8 | 63 | 168 | 35.6 | 80.8 | 230.1 |
| D | 100 g SPUR prepolymer/GE-36 g 220/2% SUL-4 | 99.32 | 5 | 45 | 197 | 38.5 | 64.3 | 273.6 |
| E | 100 g SPUR prepolymer/0.82 g BDO/1% SUL-4 | 99.78 | 12.5 | 88 | 189 | 43.0 | 68.8 | 175.0 |
| F | 100 g SPUR prepolymer/0.9 g TTA/1% SUL-4 | 99.24 | 11.8 | 84 | 213 | 56.7 | 76.4 | 171.8 |
| G | 100 g SPUR prepolymer/1 g DEG/1% SUL-4 | 99.79 | 17.3 | 96 | 164 | 80.5 | 80.0 | 153.3 |
| H | 100 g SPUR prepolymer/1.8 g TTA/1% SUL-4 | 98.73 | 18.2 | 108 | 221 | 84.7 | 82.4 | 143.5 |
| I | 100 g SPUR prepolymer/2 g DEG/1% SUL-4 | 99.72 | 18 | 70 | 129 | 116.1 | 66.0 | 151.8 |

Further examples were performed by blending commercial silylated polyurethane prepolymer 725-80 from Witton Co. Ltd with polyols as listed in Table 5. The result shows that adding 14.4% polyether polyol to SPUR prepolymer does not has a negative effect on physical properties. When low molecular weight diol or triol are added into the SPUR prepolymer, the physical properties and hardness increased.

TABLE 5

| Formulation | Tensile strength (psi) | Elongation (%) | Tack free time |
|---|---|---|---|
| 100 g Witton 725-80/1 g *A-1120/1% SUL-4 | 45 | 279 | 35 min |
| 100 g Witton 725-80/14.4 g Acclaim 4200/1 g *A-1120/1% SUL-4 | 34 | 271 | 35 min |
| 100 g Witton 725-80/14.4 g Acclaim 8200/1 g *A-1120/1% SUL-4 | 44 | 373 | 35 min |
| 100 g Witton 725-80/14.4 g 220/1 g *A-1120/1% SUL-4 | 40 | 348 | 40 min |
| 100 g Witton 725-80/0.8 g BDO/1 g *A-1120/1% SUL-4 | 55 | 366 | 40 min |
| 100 g Witton 725-80/0.9 g TTA/1 g *A-1120/1% SUL-4 | 59 | 384 | 35 min |
| 100 g Witton 725-80/1 g DEG/1 g *A-1120/1% SUL-4 | 54 | 340 | 35 min |

*A-1120: N-(beta-aminoethyl) gamma-aminoprophyltrimethoxy silane from General Electric Company.

The polyol can be added into silylated polymers either just after SPUR synthesis or during the preparation of coating, adhesive and sealant. Table 6 lists two formulation (Examples I and II), in which the polyols are added just after SPUR synthesis finished (Table 7). 1% of A-171: vinyltrimethoxy silane from General Electric Company was added together with polyols to improve the stability to moisture. The results are listed in Table 6, the viscosity of final resin is much lower than the SPUR without post-added polyols.

TABLE 6

| Materials | I | II |
|---|---|---|
| Acclaim 8200 | 100 | 100 |
| IPDI | 3.7 | 1.9 |
| Formez SUL-4 | 10 ppm | 11 ppm |
| Silquest A-Link15 | 1.8 | |
| Silquest A-Link35 | | 1.7 |
| Capping point | 0.33% | 0.10% |

TABLE 7

Polyols added during SPUR synthesis.

| Type | Sample I | Sample II |
|---|---|---|
| Silane Used | A-Link 15 | A-Link 35 |
| Polyol Type* | Acclaim 8200 | Acclaim 8200 |
| Catalyst | 10 | 11 |
| Agitation Rate (rpm) | 70 | 70 |
| Reaction Temperature | 65 C. | 65 C. |
| NCO @ capping | 0.33 | 0.10 |
| Viscosity @ Capping (cps) | 93,000 | 34,000 |
| Viscosity after capping reaction (cps) | 146,000 | 62,000 |
| Add A-171 after SPUR synthesis | 1% | 1% |
| Add Acclaim 8200 after SPUR synthesis | 36% | 36% |
| Total reaction time (min.) | 210 | 285 |
| Final viscosity after 2 days (cps) | 67,000 | 31,600 |

Obviously, other modifications and variations of the present invention are possible in light of the above teachings. It is, therefore, to be understood that changes may be made in the particular embodiments described above which run within the full intended scope of the invention as defined in the appended claims.

What is claimed is:

1. A moisture-curable composition comprising:
   a) silylated polymer;
   b) at least one polyol; and,
   c) catalyst for the silylated polymer and polyol reaction, said composition being substantially devoid of moisture,
   wherein said at least one polyol is a mixture of high molecular weight polyol and low molecular weight polyol.

2. The moisture-curable composition of claim 1, wherein the silylated polymer is at least one member selected from the group consisting of: (i) silylated polymer obtained from the reaction of polyol with isocyanatosilane, (ii) silylated polymer obtained from the reaction of hydroxyl terminated polyurethane prepolymer with isocyanatosilane; (iii) silylated polymer obtained from the reaction of isocyantoterminated polyurethane prepolymer with hydrogen active organofunctional silane that can react with isocyanate; and (iv) silylated polymer obtained from the reaction of unsaturated carbon-carbon terminated polyoxyalkylene polymer with a compound having a hydrogen-silicon bond to obtain silane terminated polyether.

3. The moisture-curable composition of claim 1, wherein the low molecular weight polyol and high molecular weight polyol have at least 2 hydroxyl groups.

4. The moisture-curable composition of claim 1, wherein the high molecular weight polyol is selected from the group consisting of aliphatic and aromatic polyester polyols, polyether polyols, polyhydroxy polycarbonates, polyhydroxy polyacetals, polyhydroxy polyacrylates, polyhydroxy polyester amides and polyhydroxy polythioethers, polyolefin polyols, and mixtures thereof.

5. The moisture-curable composition of claim 1, wherein the low molecular weight polyol is selected from the group consisting of glycols, glycerine, trimethylol propane, pentaerythritol, glycosides, sugars, alkylol amine, and mixtures thereof.

6. The moisture-curable composition of claim 5, wherein the polyol is selected from the group consisting of glycol, triethylene glycol, propylene glycol, butanediol, hexylene glycol, trimethylol propane, dietheylene glycol, dipropylene glycol, mannide, 1,2,6-hexanetriol, 1,2,4-butanetriol, trimethylol ethane, pentaerythritol, mannitol, sorbitol, sucrose, diethanolamine, triethanolamine, and mixtures thereof.

7. The moisture-curable composition of claim 4, wherein the high molecular weight polyol has an equivalent weight of at least 200.

8. The moisture-curable composition of claim 4, wherein the high molecular weight polyol has an equivalent weight of about 400 to about 20,000.

9. The moisture-curable composition of claim 4, wherein the high molecular weight polyol has an equivalent weight of about 500 to about 18,000.

10. The moisture-curable composition of claim 1, wherein the polyol is present at a level providing from about 1 to about 100 hydroxyl mole percent, per mole of alkoxy in the silylated polymer.

11. The moisture-curable composition of claim 1, wherein the polyol is present at a level providing from about 5 to about 80 hydroxyl mole percent, per mole of alkoxy in the silylated polymer.

12. The moisture-curable composition of claim 1, wherein the polyol is present at a level providing from about 5 to about 50 hydroxyl mole percent, per mole of alkoxy in the silylated polymer.

13. The moisture-curable composition of claim 1, wherein the catalyst is an organometallic catalyst.

14. The moisture-curable composition of claim 1, wherein the catalyst is an amine catalyst.

15. The moisture-curable composition of claim 1, wherein the catalyst is an amine catalyst is selected from the group consisting of primary amine, secondary amine, tertiary amine, aminosilane, and mixture thereof.

16. The moisture-curable composition of claim 13, wherein the catalyst is selected from the group consisting of organic dibutyltin, zirconium complex, aluminum chelate, titanic chelate, organic zinc, organic cobalt, organic iron, organic nickel and organobismuth, and mixture thereof.

17. The moisture-curable composition of claim 1, wherein the catalyst is a mixture of organometallic catalyst and amine catalyst.

18. A moisture-curable sealant, coating or adhesive made from the moisture-curable mixture of claim 1.

19. The moisture-curable composition of claim 1, optionally containing at least one of the following: additive, filler, dye, plasticizer, thickener, coupling agent, extender and UV stabilizers, and/or mixture thereof.

* * * * *